(12) United States Patent
Imanishi et al.

(10) Patent No.: US 10,224,533 B2
(45) Date of Patent: Mar. 5, 2019

(54) SECONDARY BATTERY COMPRISING CURRENT INTERRUPT DEVICE

(71) Applicants: Hiroaki Imanishi, Moriguchi (JP); Hiroya Umeyama, Okazaki (JP)

(72) Inventors: Hiroaki Imanishi, Moriguchi (JP); Hiroya Umeyama, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 440 days.

(21) Appl. No.: 14/416,176

(22) PCT Filed: Oct. 23, 2013

(86) PCT No.: PCT/IB2013/002369
§ 371 (c)(1),
(2) Date: Jan. 21, 2015

(87) PCT Pub. No.: WO2014/064511
PCT Pub. Date: May 1, 2014

(65) Prior Publication Data
US 2015/0243960 A1     Aug. 27, 2015

(30) Foreign Application Priority Data
Oct. 24, 2012  (JP) .................................. 2012-235017

(51) Int. Cl.
*H01M 2/34* (2006.01)

(52) U.S. Cl.
CPC ........ *H01M 2/345* (2013.01); *H01M 2200/20* (2013.01)

(58) Field of Classification Search
CPC ...................................................... H01M 2/345
See application file for complete search history.

(56) References Cited

U.S. PATENT DOCUMENTS

| | | | |
|---|---|---|---|
| 2010/0233529 A1* | 9/2010 | Nansaka | H01M 2/021 429/181 |
| 2010/0316894 A1 | 12/2010 | Hermann et al. | |
| 2011/0206958 A1* | 8/2011 | Kiyama | 429/56 |
| 2013/0196192 A1* | 8/2013 | Harada | H01M 2/345 429/61 |

FOREIGN PATENT DOCUMENTS

| | | |
|---|---|---|
| CN | 102210041 A | 10/2011 |
| JP | 06-140011 A | 5/1994 |
| JP | 09-134715 A | 5/1997 |
| JP | 2008-218193 A | 9/2008 |
| JP | 2010-113929 A | 5/2010 |
| JP | 2010-272389 A | 12/2010 |
| JP | 2010-287567 A | 12/2010 |
| JP | 2012-028008 A | 2/2012 |

* cited by examiner

Primary Examiner — Barbara L Gilliam
Assistant Examiner — Nathanael T Zemui
(74) Attorney, Agent, or Firm — Sughrue Mion, PLLC

(57) ABSTRACT

In a secondary battery (10) suggested herein, when a gas pressure in a battery case (12) is increased to or above a specified level and a current interrupt valve (26) is consequently raised to a connecting terminal (21) side, a thinned section (71) is broken around a portion that is joined to the current interrupt valve 26, the connecting terminal (21) and an electrode body are electrically interrupted from each other. An insulant (27) is disposed in a portion where the thinned section (71) is broken, and is interposed between both edges of the broken thinned section (71) after the thinned section (71) is broken.

1 Claim, 16 Drawing Sheets

SECONDARY BATTERY COMPRISING CURRENT INTERRUPT DEVICE

BACKGROUND OF THE INVENTION

1. Field of the Invention

The present invention relates to a secondary battery.

2. Description of Related Art

Japanese Patent Application Publication No. 2012-028008 (JP 2012-028008 A) discloses a sealed battery that includes a current interrupt device for cutting off a battery current when an internal pressure of a battery case is increased due to generation of an abnormal gas. The current interrupt device disclosed therein includes a hollow cylindrical electrode terminal that has a flange at one end thereof and a current interrupt valve. The electrode terminal is attached to the battery case in an insulated state while interposing a sealing material in a hole provided in the battery case such that the flange is positioned in the battery case. The current interrupt valve is a convex plate material and is attached to the flange of the electrode terminal so as to project toward an inner side of the battery case. Here, the convex-shaped top of the current interrupt valve is welded to a current collector that is housed in the battery case. A connecting portion of the current collector with the current interrupt valve is thinner than the rest of the portions. The current interrupt valve is a reverse valve and keeps its convex shape that is projected to the inner side of the battery case until the internal pressure of the secondary battery reaches a specified interrupt pressure. Once the internal pressure of the secondary battery exceeds the specified interrupt pressure, the current interrupt valve is reversed (deformed toward the electrode terminal side). At this time, the thinned portion is broken, thereby separating the current collector from the current interrupt valve.

In Japanese Patent Application Publication No. 2008-218193 (JP 2008-218193 A), when the current interrupt valve is reversed (deformed toward the electrode terminal side), the current collector is prevented from being drawn toward the current interrupt valve side, and thus a broken portion of the current collector can be prevented from being deformed and rising toward the current interrupt valve. Accordingly, it is disclosed that the broken portion of the current collector is less likely to contact the current interrupt valve again after the current is interrupted.

Japanese Patent Application Publication No. 09-134715 (JP 09-134715 A) (Japanese Patent No. 3649491) discloses a current interrupt device by which a joined portion between the current interrupt valve and the current collector is separated when the current interrupt valve is reversed. Here, it is disclosed to dispose a compressed elastic member (styrene-butadiene rubber) between the current interrupt valve and the current collector. In this case, it is also disclosed that, after the joined portion between the current interrupt valve and the current collector is separated, the elastic member is elastically returned and expanded to prevent the current interrupt valve and the current collector from being joined to each other again.

For example, like JP 2008-218193 A and JP 09-134715 A (Japanese Patent No. 3649491), various structures to prevent electrical reconnection between the current interrupt valve and the current collector after the current interrupt valve is reversed and the current interrupt valve and the current collector are electrically interrupted have been suggested. In JP 09-134715 A (Japanese Patent No. 3649491), welding of the current interrupt valve and the current collector is peeled when the current interrupt valve is reversed. In other words, it is not a structure in which the current collector is broken and thus the current interrupt valve and the current collector are electrically interrupted when the current interrupt valve is reversed. In addition, JP 2008-218193 A discloses a structure in which the current collector is broken and thus the current interrupt valve and the current collector are electrically interrupted when the current interrupt valve is reversed. However, in this case, the current interrupt valve and the current collector may be electrically reconnected when the current interrupt valve is returned from a reversed condition.

SUMMARY OF THE INVENTION

A first aspect of the present invention relates to a secondary battery. The secondary battery includes a battery case, an electrode body housed in the battery case, a connecting terminal provided in the battery case, and a current interrupt device that includes a current interrupt valve, a current collector, and an insulant, that electrically connects the connecting terminal to the electrode body, and that electrically cuts off the connecting terminal from the electrode body when a gas pressure in the battery case is increased to or above a specified level. The current interrupt valve is formed of a conductive thin plate and is attached to an opening of the connecting terminal on an inner side of the battery case to cover the opening. The current collector includes: a thickened section that is provided in a position to face a surface of the current interrupt valve on the inner side of the battery case; and a thinned section that is formed at a center of the thickened section and joined to the current interrupt valve. When the gas pressure in the battery case is increased to or above the specified level, and the current interrupt valve is raised to the connecting terminal side, the thinned section is broken around a portion that is joined to the current interrupt valve, and the connecting terminal is electrically interrupted from the electrode body. The insulant is disposed in a portion where the thinned section is broken and is interposed between both edges of the broken thinned section after the thinned section is broken.

Here, the insulant may be a film. The insulant may be disposed between the current interrupt valve and the current collector. The thinned section is formed with a notch that determines a portion to be broken, and the insulant may extend beyond the notch to the portion to be broken. The insulant is attached to a surface on the current collector side of the portion where the thinned section is joined to the current interrupt valve, and may cover at least a part of the thinned section. The thinned section is formed with the notch that determines the portion to be broken, and the insulant may be attached to the thinned section in a side of the portion to be broken from the notch and extend beyond the notch to an outer side of the portion to be broken.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
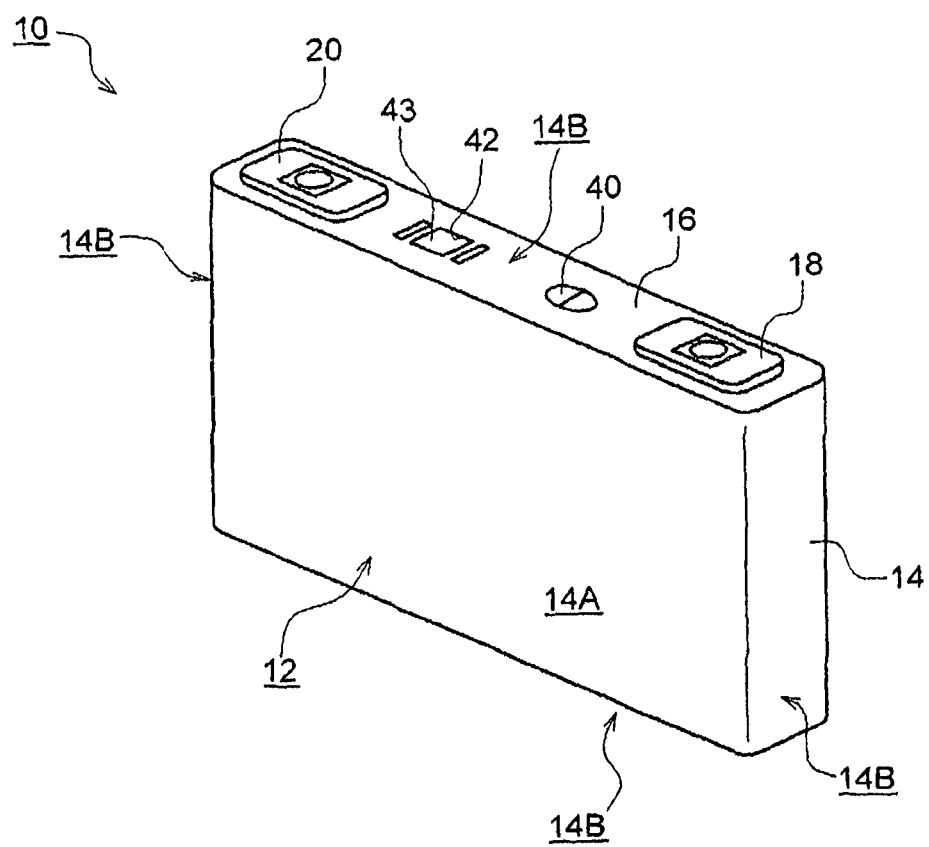
FIG. 1 is an external perspective view of a lithium-ion battery according to one embodiment of the present invention.

A description will hereinafter be made on a secondary battery according to an embodiment of the present invention. Needless to say, the embodiment will be described without any intention to particularly limit the present invention. In addition, dimensional relationships (such as length, width, and thickness) in each of the drawings do not reflect actual dimensional relationships. A member or a component with a same effect will be denoted with the same reference numeral, and description thereof will not be repeated or will be simplified.

A lithium-ion battery in which an electrode body of wound type (hereinafter referred to as "a wound electrode body") and a nonaqueous electrolytic solution are housed in a polygonal (that is, a box-shaped rectangular parallelepiped) case will be raised as an example below. It should be noted that a type of the secondary battery is not limited to the lithium secondary battery (typically, the lithium-ion battery that includes a nonaqueous electrolyte) in the present invention as long as a current interrupt device to be disclosed herein is included. The present invention can also be applied to other types of the secondary battery such as a nickel hydrogen battery. Furthermore, a battery structure is not limited, and thus the present invention is not particularly limited to a polygonal battery. For example, the wound electrode body is raised as an example of the electrode body; however, the electrode body of laminated type may be used instead. Moreover, the wound electrode body in a flat shape is raised as an example of the wound electrode body; however, the wound electrode body may have a cylindrical shape.

Figure 2:
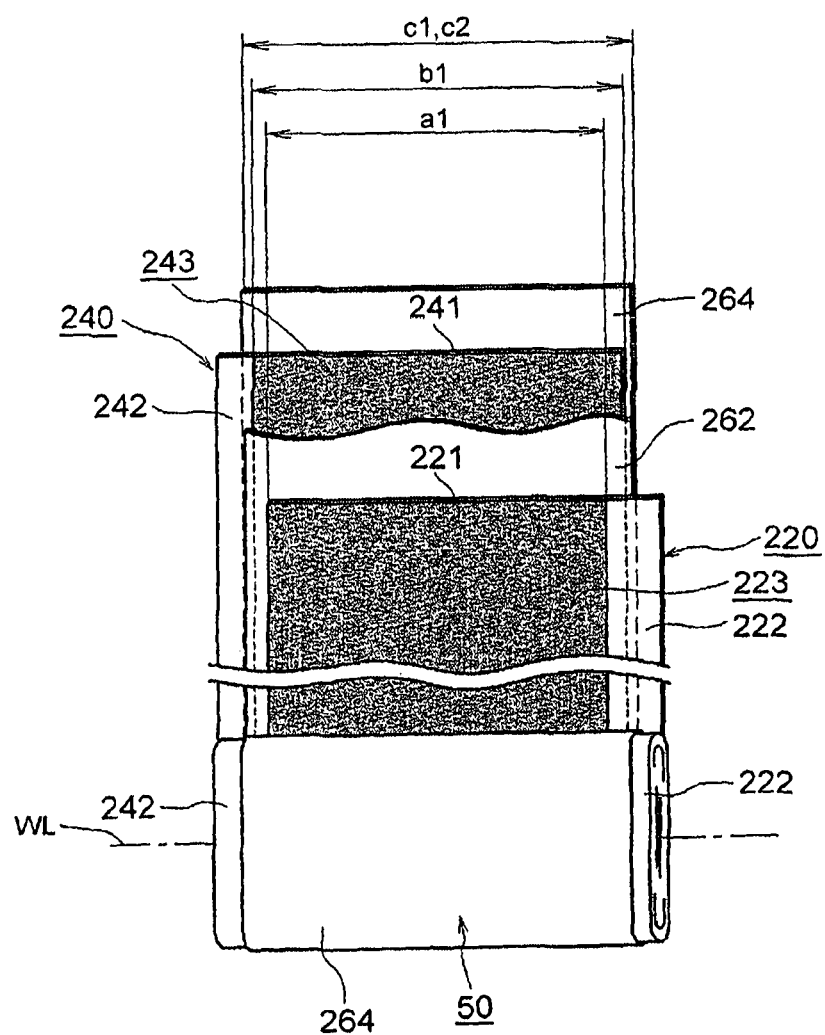
FIG. 2 is a view for showing a wound electrode body that is installed in the lithium-ion battery according to the embodiment of the present invention.

FIG. 1 is an external perspective view of a lithium-ion battery 10 according to the embodiment of the present invention. FIG. 2 is a view for showing a wound electrode body 50 that is installed in the lithium-ion battery 10. In FIG. 2, each sheet (a positive electrode sheet 220, a negative electrode sheet 240, and separators 262, 264) is shown in a partially developed state to illustrate a wound structure of the wound electrode body 50.

The lithium-ion battery 10 according to the embodiment of the present invention is configured by a flat polygonal battery case (that is, an outer container) 12 such as that shown in FIG. 1. As shown in FIG. 2, in the lithium-ion battery 10, the wound electrode body 50 in the flat shape is housed together with a liquid electrolyte (electrolytic solution), which is not shown, in the battery case 12.

<<Battery Case 12>>

The battery case 12 is formed of a box-shaped (in other words, bottomed and rectangular parallelepiped) case main body 14 that has an opening at one end (that corresponds to an upper end thereof during normal use of the battery 10) and a sealing plate 16 (lid body) formed of a rectangular plate member that is attached to the opening to seal the opening. The sealing plate 16 is welded to a peripheral edge of the opening of the case main body 14. Accordingly, the battery case 12 has a hexahedron shape and a sealing structure that includes paired case broad width surfaces 14A that face a broad width surface of the flat-shaped wound electrode body 50 and four rectangular case surfaces 14B that are adjacent to the case broad width surfaces 14A (that is, a rectangular case upper surface thereof is configured of the sealing plate 16).

A material for the battery case 12 is not particularly limited as long as it is used in a common sealed battery. It is preferred that the battery case 12 be primarily formed of a lightweight metal material with high thermal conductivity. Examples of such a metal material include aluminum, stainless steel, and nickel-plated steel. The battery case 12 (the case main body 14 and the sealing plate 16) according to this embodiment is formed of aluminum or an alloy that is primarily formed of aluminum.

As shown in FIG. 1, a positive electrode terminal 18 (exterior terminal) and a negative electrode terminal 20 (exterior terminal) for external connection are formed on the sealing plate 16. An appropriately shaped terminal can be attached to these exterior terminals 18, 20 according to a usage pattern of the lithium-ion battery 10 according to this embodiment.

A thinned safety valve 40 that releases an internal pressure when the internal pressure of the battery case 12 is increased to or above a specified level (for example, a set valve opening pressure is approximately 0.3 MPa to 1.0 MPa), and an liquid inlet port 42 are formed between both of the terminals 18, 20 on the sealing plate 16. It should be noted that FIG. 1 shows a state in which the liquid inlet port 42 is sealed by a sealing material 43 after a liquid is injected therefrom.

<<Wound Electrode Body 50 (Electrode Body)>>

As shown in FIG. 2, the wound electrode body 50 includes a long sheet-like positive electrode (the positive electrode sheet 220), a long sheet-like negative electrode (the negative electrode sheet 240) that is similar to the positive electrode sheet 220, and two long sheet-like separators (the separators 262, 264).

<<Positive Electrode Sheet 220>>

The positive electrode sheet 220 includes a band-shaped positive electrode current-collecting foil 221 and a positive electrode active material layer 223. A metal foil that is suitable for a positive electrode can preferably be used for the positive electrode current-collecting foil 221. For example, a band-shaped aluminum foil that has a specified width and thickness of approximately 15 μm can be used for the positive electrode current-collecting foil 221. A non-coated section 222 is set along one of edges in a width direction of the positive electrode current-collecting foil 221. In an illustrated example, the positive electrode active material layer 223 is held on both surfaces of the positive electrode current-collecting foil 221 except on the non-coated section 222 that is set in the positive electrode current-collecting foil 221. The positive electrode active material layer 223 contains a positive electrode active material. The positive electrode active material layer 223 is formed by coating the positive electrode current-collecting foil 221 with a positive electrode mixture that contains the positive electrode active material.

One kind or two or more kinds of materials that are commonly used in the lithium-ion battery can be used as the positive electrode active material without any limitation. Preferred examples include: an oxide that contains lithium and a transition metal element as constituent metal elements (lithium transition metal oxide) such as lithium-nickel oxide (for example, $LiNiO_2$), lithium-cobalt oxide (for example, $LiCoO_2$), and lithium-manganese oxide (for example, $LiMn_2O_4$); and phosphate that contains lithium and the transition metal element as the constituent metal elements such as lithium manganese phosphate ($LiMnPO_4$) and lithium iron phosphate ($LiFePO_4$).

<<Conductive Material>>

A carbon material such as carbon powder or carbon fiber is raised as an example of a conductive material. One type selected from such a conductive material may be used singly, or two or more types may be used together. As the carbon powder, various types of carbon black (for example, acetylene black, oil-furnace black, graphite carbon black, carbon black, graphite, and Ketjen black) and graphite powder can be used.

<<Binder>>

A binder binds particles of the positive electrode active material and particles of the conductive material contained in the positive electrode active material layer 223 and also binds these particles and the positive electrode current-collecting foil 221. A polymer that is soluble or dispersible in a solvent to be used can be used as such a binder. For example, in a positive electrode mixture composition that uses an aqueous solvent, it is possible to preferably adopt a water-soluble polymer or a water-dispersible polymer such as a cellulosic polymer (carboxymethyl cellulose (CMC), hydroxypropyl methyl cellulose (HPMC), or the like), a fluorine resin (for example, polyvinyl alcohol (PVA), polytetrafluoroethylene (PTFE), a tetrafluoroethylene-hexafluoropropylene copolymer (FEP), or the like), or rubber (a vinyl acetate copolymer, a styrene-butadiene copolymer (SBR), an SBR resin with acrylic acid (SBR latex), or the like). In addition, in the positive electrode mixture composition that uses a non-aqueous solvent, it is possible to preferably adopt a polymer (polyvinylidene fluoride (PVDF), polyvinylidene chloride (PVDC), polyacrylonitrile (PAN), or the like).

<<Negative Electrode Sheet 240>>

As shown in FIG. 2, the negative electrode sheet 240 includes a band-shaped negative electrode current-collecting foil 241 and a negative electrode active material layer 243. A metal foil that is suitable for the negative electrode can preferably be used for the negative electrode current-collecting foil 241. For the negative electrode current-collecting foil 241, a band-shaped copper foil that has a specified width and thickness of approximately 10 μm is used. A non-coated section 242 is set along one of edges in a width direction of the negative electrode current-collecting foil 241. The negative electrode active material layer 243 is formed on both surfaces of the negative electrode current-collecting foil 241 except on the non-coated section 242 that is set in the negative electrode current-collecting foil 241. The negative electrode active material layer 243 is held on the negative electrode current-collecting foil 241 and at least contains a negative electrode active material. The negative electrode active material layer 243 is formed by coating the negative electrode current-collecting foil 241 with a negative electrode mixture that contains the negative electrode active material.

<<Negative Electrode Active Material>>

One kind or two or more kinds of materials that are used in the common lithium-ion battery can be used as the negative electrode active material without any limitation. Preferred examples include a carbon material such as graphite carbon and amorphous carbon, a lithium transition metal oxide, and lithium transition metal nitride. In addition, a separator sheet that is formed of a porous polyolefin resin can be raised as a preferred example of the separator sheet, which is described above.

<<Separators 262, 264>>

As shown in FIG. 2, the separators 262, 264 partition the positive electrode sheet 220 and the negative electrode sheet 240. In this example, each of the separators 262, 264 is formed of a band-shaped sheet material in a specified width that has plural minute holes. As the separators 262, 264, for example, a separator of a single layer structure or a separator of a laminated structure that is formed of a porous polyolefin resin can be used. In this example, as shown in FIG. 2, a width b1 of the negative electrode active material layer 243 is slightly larger than a width a1 of the positive electrode active material layer 223. Furthermore, widths c1, c2 of the separators 262, 264 are slightly larger than the width b1 of the negative electrode active material layer 243 (c1, c2>b1>a1).

It should be noted that each of the separators 262, 264 is formed of a sheet-like member in the example shown in FIG. 2. Any member can be used for the separators 262, 264 as long as it insulates the positive electrode active material layer 223 and the negative electrode active material layer 243 and also permits movement of the electrolyte. Therefore, the separators 262, 264 are not limited to the sheet-like member. Instead of the sheet-like member, each of the separators 262, 264 may be formed of a layer of insulating particles that is formed on a surface of the positive electrode active material layer 223 or a surface of the negative electrode active material layer 243. Here, as the insulating particle may be composed of an inorganic filler with an insulating property (such as a filler of a metal oxide or a metal hydroxide) or an insulating resin particle (such as a particle of polyethylene or polypropylene).

<<Liquid Electrolyte (Electrolytic Solution)>>

As the liquid electrolyte (electrolytic solution), the non-aqueous electrolytic solution that is used for the common lithium-ion battery or a solution that is similar to the nonaqueous electrolytic solution can be used without any limitation. Such a nonaqueous electrolytic solution typically has a composition in which an appropriate nonaqueous solvent contains a supporting salt. As the nonaqueous solvent, one type or two or more types can be selected from a group of, for example, ethylene carbonate, propylene carbonate, dimethyl carbonate, diethyl carbonate, ethyl methyl carbonate, 1,2-dimethoxyethan, 1,2-diethoxyethane, tetrahydrofuran, 1,3-dioxolane, and the like. In addition, as the supporting salt, lithium salt such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, or the like can be used. As an example, the nonaqueous electrolytic solution can be raised in which a mixed solvent of ethylene carbonate and diethyl carbonate (for example, a mass ratio of 1:1) contains $LiPF_6$ at concentration of approximately 1 mol/L. It should be noted that a solid or gelatinous electrolyte may be adopted instead of the electrolytic solution.

<<Attachment of Wound Electrode Body 50>>

In this embodiment, as shown in FIG. 2, the wound electrode body 50 is pressed and bent to be flat in one direction that is orthogonal to a winding axis WL. In the example shown in FIG. 2, the non-coated section 222 of the positive electrode current-collecting foil 221 and the non-coated section 242 of the negative electrode current-collecting foil 241 are exposed to both sides of the separators 262, 264 in a spiral manner.

Figure 3:
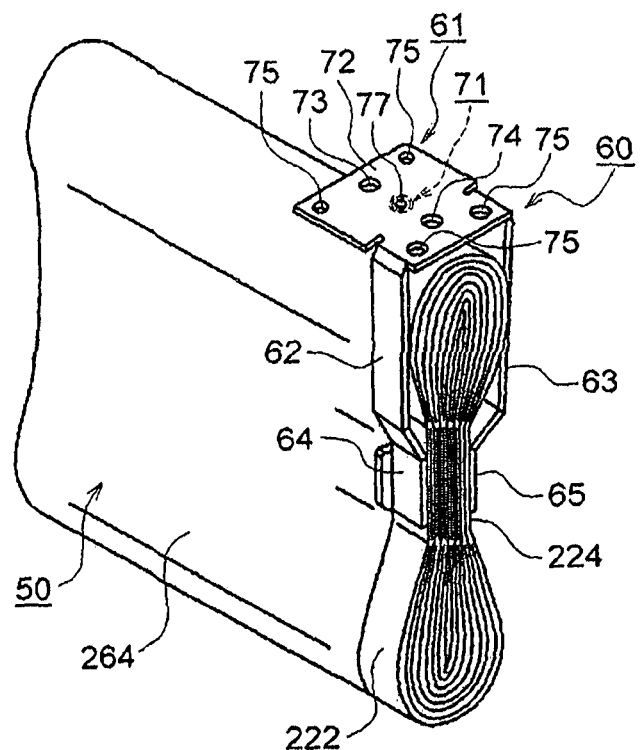
FIG. 3 is a perspective view for showing a positive electrode current collector (internal terminal) that is attached to the wound electrode body according to the embodiment of the present invention.

FIG. 3 is a perspective view for showing a positive electrode current collector 60 (internal terminal) that is attached to the wound electrode body 50. In this embodiment, as shown in FIG. 3, an intermediate section 224 of the non-coated section 222 (242) is collected and welded to the positive electrode current collector 60 (internal terminal) that is disposed in the battery case 12.

<<Positive Electrode Current Collector 60 (Internal Terminal)>>

Here, the positive electrode current collector 60 (may also be referred to as "the internal terminal") is a member that is electrically connected to the wound electrode body 50 housed in the battery case 12. In this embodiment, the positive electrode current collector 60 is made of aluminum or an alloy that contains aluminum as a main material (aluminum alloy). As shown in FIG. 3, the positive electrode current collector 60 includes an internal terminal section 61, arm sections 62, 63, and current-collecting tabs 64, 65. The internal terminal section 61 is a substantially rectangular flat plate. The arm sections 62, 63 extend from opposing sides of the internal terminal section 61. The current-collecting tabs 64, 65 are welded portions that are provided at tips of the arm sections 62, 63.

In this embodiment, as shown in FIG. 2, the positive electrode non-coated section 222 of the positive electrode sheet 220 that is wound in the spiral manner is exposed in a substantially ellipsoidal shape on one side in the winding axis direction of the wound electrode body 50 that is pressed and bent to be flat. As shown in FIG. 3, the internal terminal section 61 is disposed to face a curved surface of a curved section (an upper curved section in an example shown in FIG. 3) on one side of the positive electrode non-coated section 222 that is exposed in the substantially ellipsoidal shape. Each of the arm sections 62, 63 has a shape that is bent from the internal terminal section 61. The arm sections 62, 63 extend to the intermediate section 224 of the non-coated section 222 (242) so as to hold the positive electrode non-coated section 222 that is exposed in the substantially ellipsoidal shape therebetween. As shown in FIG. 3, the intermediate section 224 of the non-coated section 222 is bundled. The intermediate section 224 is held between the current-collecting tabs 64, 65 that are provided at the tips of the arm sections 62, 63. Then, the current-collecting tabs 64, 65 and the intermediate section 224 of the non-coated section 222 are welded together.

FIG. 3 only shows the positive electrode side of the wound electrode body 50; however, the negative electrode side thereof, which is not shown, has the same structure. The negative electrode terminal 20 for the external connection is electrically connected to the wound electrode body 50 via a negative electrode current-collecting tab and a negative electrode current collector that are not shown and are disposed in the battery case 12.

<<Current Interrupt Device 80>>

As described above, the lithium-ion battery 10 includes the battery case 12 and the wound electrode body 50 (electrode body) that is housed in the battery case 12. The lithium-ion battery 10 includes a current interrupt device 80 that cuts off a battery current when the internal pressure of the battery case 12 becomes abnormally high. In this embodiment, the current interrupt device 80 is constructed between the positive electrode terminal 18 (exterior terminal) and the positive electrode current collector 60 (internal terminal) in a conductive path of the battery current in the positive electrode.

As shown in FIG. 3, the internal terminal section 61 of the positive electrode current collector 60 (internal terminal) is the substantially rectangular flat plate and is formed with a circular thinned section 71 at a center thereof. A periphery of the thinned section 71 (a thickened section 72) is sufficiently thicker than the thinned section 71 and has required rigidity. In this embodiment, the thickened section 72 is formed with openings 73, 74 in both sides with the thinned section 71 being positioned therebetween. In addition, attachment holes 75 are formed at four corners of the thickened section 72.

<<Thinned Section 71>>

Figure 4:
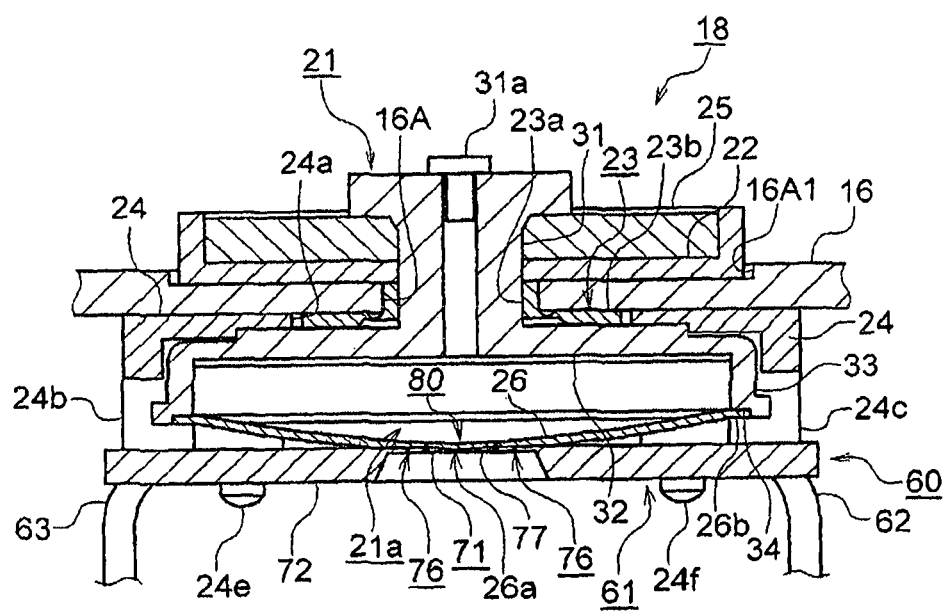
FIG. 4 is a cross-sectional view of a current interrupt device according to the embodiment of the present invention.
Figure 5:
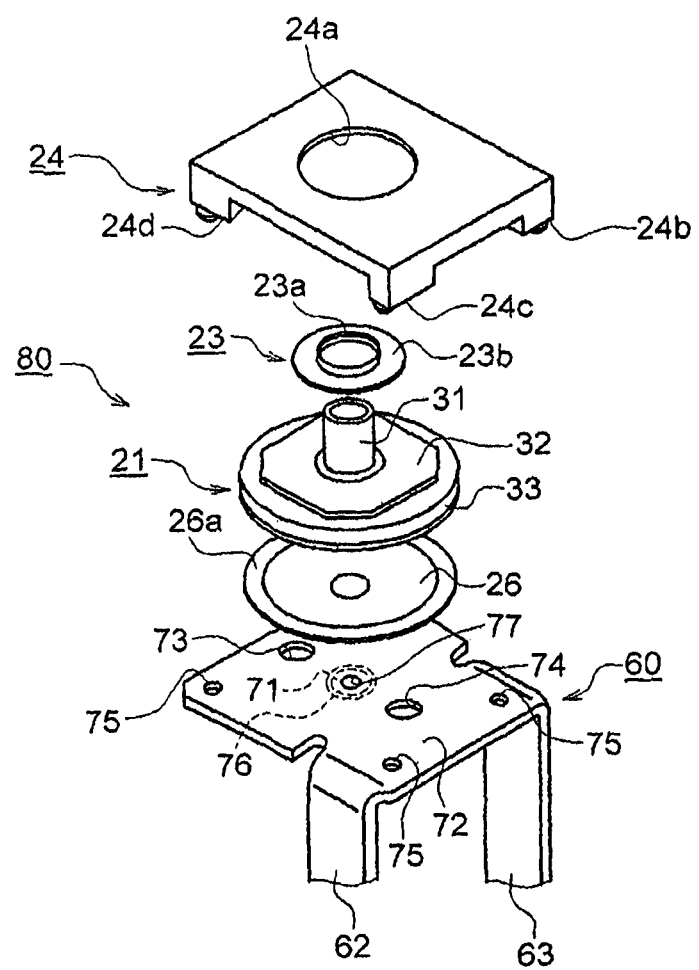
FIG. 5 is an exploded perspective view of the current interrupt device according to the embodiment of the present invention.

As shown in FIG. 3 to FIG. 5, in this embodiment, the thinned section 71 is formed in a substantially circular shape at the center of the thickened section 72. Also, in this embodiment, the thinned section 71 is formed of aluminum or an aluminum alloy. An annular notch 76 (acute-angled groove) is formed along a circle with a specified diameter above the center. The notch 76 can be formed by engraving with an acute-angled blade. A hole 77 is formed on the inner side of the notch 76 in a radial direction.

Figure 6:
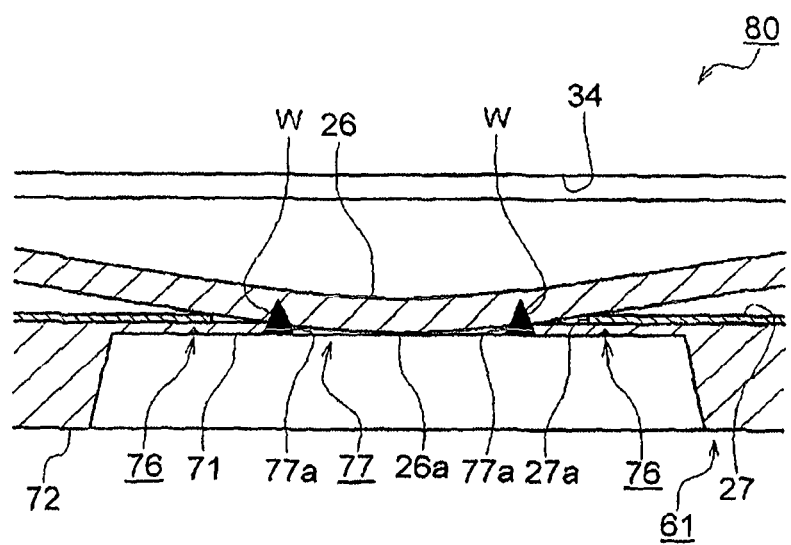
FIG. 6 is an enlarged view of a current interrupt section of the current interrupt device according to the embodiment of the present invention.

Here, FIG. 4 shows a cross section that goes through the approximate center of the positive electrode terminal 18 (exterior terminal) along a thickness direction of the battery case 12. FIG. 5 is an exploded perspective view of each component of the current interrupt device 80. FIG. 6 is an enlarged view of the current interrupt section of the current interrupt device 80.

<<Positive Electrode Terminal Mounting Hole 16A>>

In this embodiment, as described above, the battery case 12 of the lithium-ion battery 10 includes the polygonal case main body 14 whose one surface is open and the sealing plate 16 (lid body) that is attached to the case main body 14 (see FIG. 1). The positive electrode terminal 18 (exterior terminal) for which the current interrupt device 80 is constructed (see FIG. 4) is provided on the sealing plate 16. The positive electrode terminal 18 is electrically connected to the positive electrode current collector 60 (internal terminal) and a positive electrode element of the wound electrode body 50 in the battery case 12 via the current interrupt device 80 (see FIG. 3). As shown in FIG. 4, the sealing plate 16 is formed with a positive electrode terminal mounting hole 16A. A step 16A1 is provided around the positive electrode terminal mounting hole 16A for mounting the positive electrode terminal 18.

<<Structure of Positive Electrode Terminal 18>>

Here, as shown in FIG. 4 to FIG. 6, the positive electrode terminal 18 including the current interrupt device 80 includes a connecting terminal 21, a first gasket 22, a second gasket 23, an insulating holder 24, a Z terminal 25, a current interrupt valve 26 (reversing plate), and an insulating film 27 as an insulant (see FIG. 6). It should be noted that the insulating film 27 is not shown in FIG. 4 and FIG. 5.

<<Connecting Terminal 21>>

In this embodiment, as shown in FIG. 4 and FIG. 5, the connecting terminal 21 is fixed to the positive electrode terminal mounting hole 16A that is formed in the sealing plate 16. In this embodiment, the connecting terminal 21 has a rivet-like structure by which it is inserted in and fixed to the positive electrode terminal mounting hole 16A, and includes a cylindrical section 31 and a head section 32. The head section 32 is provided at one end of the cylindrical section 31 and is spread in a flat plate shape from the end of the cylindrical section 31 to an outer diameter side. An outer diameter end 33 of the head section 32 that is spread in the flat plate shape has a shape that is continuous in a circumferential direction and is raised in a direction to separate from the cylindrical section 31 along an axis of the cylindrical section 31. A tip of the outer diameter end 33 serves as an opening at one end of the connecting terminal 21. A receiving section 34 for receiving the current interrupt valve 26 is provided at a tip of the outer diameter end 33. The receiving section 34 is provided with a step to which the disk-shaped current interrupt valve 26 is fitted.

<<First Gasket 22, Second Gasket 23>>

Each of the first gasket 22 and the second gasket 23 is an elastic member with an insulating property such as rubber. The first gasket 22 and the second gasket 23 are mounted in a gap between the connecting terminal 21 and the sealing plate 16. The first gasket 22 and the second gasket 23 insulate the connecting terminal 21 and the sealing plate 16 and secure airtightness of the battery case 12 in a portion where the connecting terminal 21 is mounted.

In this embodiment, the first gasket 22 is a substantially disk-shaped member that is disposed to cover a periphery of the positive electrode terminal mounting hole 16A on the outer side of the sealing plate 16. The second gasket 23 includes a cylindrical section 23a and a flat plate section 23b. The cylindrical section 23a is provided at one end of the second gasket 23. The flat plate section 23b extends in a flat plate shape (in this embodiment, a disk shape) radially outward from one end of the cylindrical section 23a. The cylindrical section 23a of the second gasket 23 is mounted to an outer periphery of the cylindrical section 31 in the connecting terminal 21 and is inserted in the positive electrode terminal mounting hole 16A together with the cylindrical section 31 of the connecting terminal 21. The flat plate section 23b of the second gasket 23 extends from the positive electrode terminal mounting hole 16A along the inner side of the sealing plate 16 and is held between an inner surface of the sealing plate 16 and the head section 32 of the connecting terminal 21.

<<Insulated Holder 24>>

Figure 7:
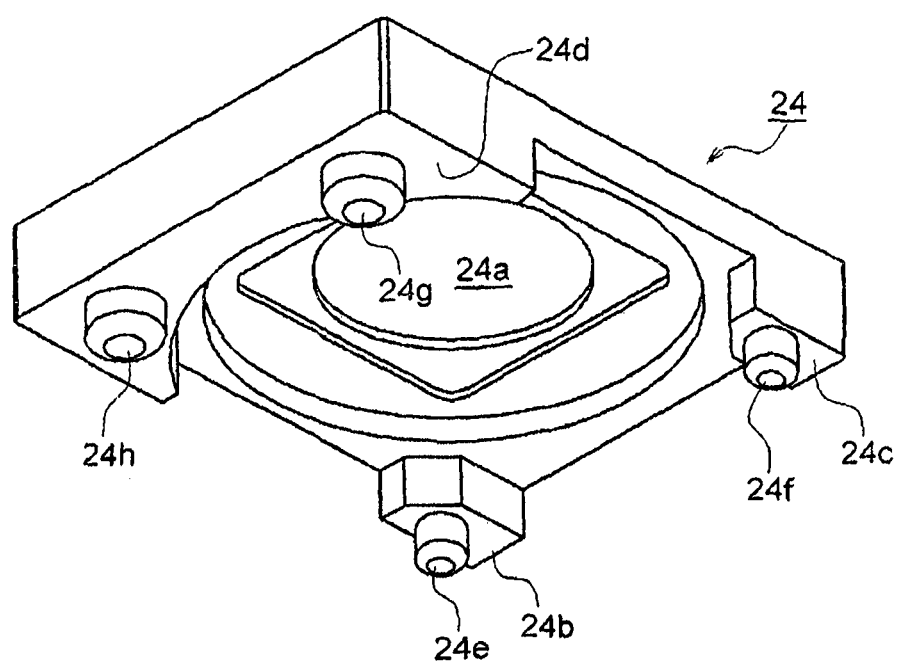
FIG. 7 is a perspective view for showing an inner side of an the insulating holder according to the embodiment of the present invention.

FIG. 7 is a perspective view for showing an inner side of the insulating holder 24 (a side to which the outer diameter end 33 of the connecting terminal 21 and the positive electrode current collector 60 (internal terminal) are attached). As shown in FIG. 4, FIG. 5, and FIG. 7, the insulating holder 24 is a substantially ring-shaped plate and a member with an insulating property (such as a member made of a resin). A circular hole 24a to which the second gasket 23 is fitted is formed at the center of the insulating holder 24. In a lower side of the insulating holder 24 (the positive electrode current collector 60 (internal terminal) side), supporting sections 24b, 24c, 24d extend around the head section 32 of the connecting terminal 21 toward the positive electrode current collector 60 (internal terminal). The supporting sections 24b, 24c, 24d are provided with projections 24e, 24f, 24g, 24h.

As shown in FIG. 4, the insulating holder 24 is attached to the inner surface of the sealing plate 16 and interposed between the inner surface of the sealing plate 16 and the head section 32 of the connecting terminal 21. The insulating holder 24 insulates the sealing plate 16 and the connecting terminal 21 and fixes the head section 32 of the connecting terminal 21 to the inner surface of the sealing plate 16.

<<Z Terminal 25>>

The Z terminal 25 is a ring-shaped plate member with a conductive property, mounted to the cylindrical section 31 of the connecting terminal 21 on the outer side of the sealing plate 16, and disposed on the first gasket 22.

<<Attachment to the Sealing Plate 16>>

As shown in FIG. 4 and FIG. 5, the connecting terminal 21, the first gasket 22, the second gasket 23, the insulating holder 24, and the Z terminal 25 are attached to the positive electrode terminal mounting hole 16A of the sealing plate 16.

For example, the cylindrical section 23a of the second gasket 23 is mounted to the cylindrical section 31 of the connecting terminal 21. The insulating holder 24 is mounted around the positive electrode terminal mounting hole 16A on the inner surface of the sealing plate 16. Then, together with the second gasket 23, the cylindrical section 31 of the connecting terminal 21 is inserted in the positive electrode terminal mounting hole 16A of the sealing plate 16 from the inner side of the sealing plate 16. Next, the first gasket 22 is attached to the cylindrical section 31 of the connecting terminal 21 that is projected from the positive electrode terminal mounting hole 16A, and is disposed on the sealing plate 16. Furthermore, the Z terminal 25 is attached to the cylindrical section 31 and is disposed on the first gasket 22. In this state, a tip of the cylindrical section 31 is pressed such that the tip of the cylindrical section 31 is spread to the outer diameter side, and the sealing plate 16 is caulked with the connecting terminal 21. Accordingly, the connecting terminal 21, the first gasket 22, the second gasket 23, the insulating holder 24, and the Z terminal 25 are attached to the positive electrode terminal mounting hole 16A of the sealing plate 16. A sealing cap 31a for sealing an opening of the cylindrical section 31 is inserted in the tip of the cylindrical section 31. The current interrupt valve 26 is attached to an assembly of such a connecting terminal 21.

<<Current Interrupt Valve 26>>

The current interrupt valve 26 is formed of a conductive thin plate. The current interrupt valve 26 is also referred to as a reversing plate. The current interrupt valve 26 has a substantial disk shape that can be fitted to the receiving section 34 of the connecting terminal 21 provided on the inner side of the sealing plate 16. A center 26a of the current interrupt valve 26 is gently curved and bumped from a peripheral edge. The current interrupt valve 26 is mounted to the receiving section 34 of the connecting terminal 21 such that the center thereof is bumped toward the inner side of the battery case 12. Then, a peripheral edge 26b of the current interrupt valve 26 is joined to the receiving section 34 for a whole circumference. Accordingly, the current interrupt valve 26 seals an opening 21a of the connecting terminal 21 on the inside of the battery case 12. In other words, the current interrupt valve 26 partitions the inside of the connecting terminal 21 and the inner side of the battery case 12 in an airtight manner. The current interrupt valve 26 and the connecting terminal 21 may be joined by welding (laser welding in this embodiment), for example. This can secure required joining strength as well as required airtightness.

The current interrupt valve 26 is welded to the internal terminal section 61 of the positive electrode current collector 60 (internal terminal), which is described above. The center 26a of the current interrupt valve 26 is fitted to the hole 77 that is formed at a center of the thinned section 71 in the internal terminal section 61. Then, the center 26a of the current interrupt valve 26 and the thinned section 71 are joined together at a peripheral edge 77a of the hole 77. In this embodiment, the current interrupt valve 26 and the thinned section 71 are welded by laser welding or resistance welding.

The attachment holes 75 that are provided at the four corners of the internal terminal section 61 are fitted to the projections 24e, 24f, 24g, 24h of the insulating holder 24. Then, the internal terminal section 61 of the positive electrode current collector 60 is fixed to the insulating holder 24 by thermal deformation of the projections 24e, 24f, 24g, 24h of the insulating holder 24.

<<Electrical Path of the Positive Electrode>>

As a consequence of adopting the above structure, as shown in FIG. 3 and FIG. 4, the positive electrode (positive electrode terminal 18) of the lithium-ion battery 10 is formed with an electrical path from a positive electrode non-coated section 222 of the positive electrode sheet 220 to the current-collecting tabs 64, 65 (positive electrode current collector 60) that are welded to the non-coated section 222, the arm sections 62, 63, the internal terminal section 61 (positive electrode current collector 60), the current interrupt valve 26, the connecting terminal 21, and the Z terminal 25. Such an electrical path and the sealing plate 16 (battery case 12) are insulated by the first gasket 22, the second gasket 23, and the insulating holder 24.

<<Operation of Current Interrupt Device 80>>

Here, the thinned section 71 of the internal terminal section 61 and the center 26a of the current interrupt valve 26 are subject to the internal pressure of the battery case 12. At this time, the internal pressure of the battery case 12 acts to raise the current interrupt valve 26 to the connecting terminal 21 side. Meanwhile, the thickened section 72 that is provided around the thinned section 71 of the internal terminal section 61 is fixed to the sealing plate 16 (battery case 12) by the insulating holder 24. Thus, a shearing force acts around a portion of the thinned section 71 that is joined to the current interrupt valve 26. Then, when a gas pressure in the battery case 12 is increased to or above a specified level, the thinned section 71 is broken around the portion thereof that is joined to the current interrupt valve 26, and the connecting terminal 21 and the wound electrode body 50 are electrically interrupted.

In this embodiment, the annular notch 76 is formed along the circle with a specified diameter at the center of the thinned section 71 of the internal terminal section 61. The thinned section 71 is further thinned in a portion where the notch 76 is formed, and the shearing force is concentrated thereon. Therefore, when the thinned section 71 is broken due to the internal pressure of the battery case 12 acting thereon, the thinned section 71 is broken along the notch 76. Accordingly, a portion where the thinned section 71 is broken is determined by the notch 76.

<<Insulating Film 27 (Insulant)>>

Figure 8:
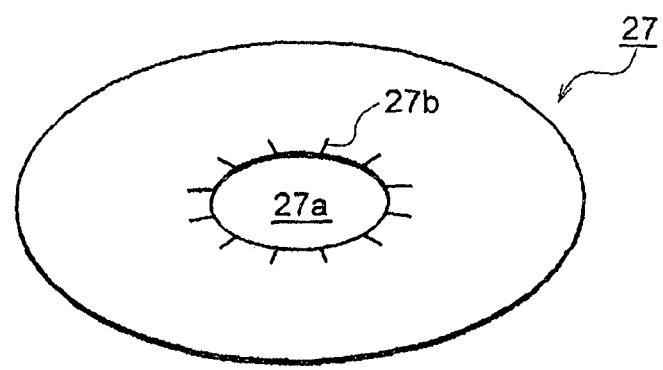
FIG. 8 is a view for showing an insulating film according to the embodiment of the present invention.

As shown in FIG. 6, the insulating film 27 as the insulant is disposed in the portion where the thinned section 71 is to be broken and extends between both of the edges of the broken thinned section 71 after the thinned section 71 is broken. In this embodiment, as shown in FIG. 6, the insulating film 27 is disposed between the current interrupt valve 26 and the internal terminal section 61. FIG. 8 is a view for showing the insulating film 27 according to this embodiment. As shown in FIG. 8, the insulating film 27 is a disk-shaped film and has a circular hole 27a. Slits 27b are formed around the circular hole 27a.

The circular hole 27a is larger than the joined portion of the current interrupt valve 26 and the internal terminal section 61 and is formed along a circle that is smaller than the notch 76 formed in the thinned section 71 of the internal terminal section 61. As shown in FIG. 6, the insulating film 27 is disposed on the internal terminal section 61 such that the joined portion of the current interrupt valve 26 and the internal terminal section 61 is fitted to the circular hole 27a. As described above, the insulating film 27 extends to the inner side of the notch 76 on the internal terminal section 61. It should be noted that the insulating film 27 is a thin film material and is not shown in FIG. 4 as a matter of convenience.

Figure 9:
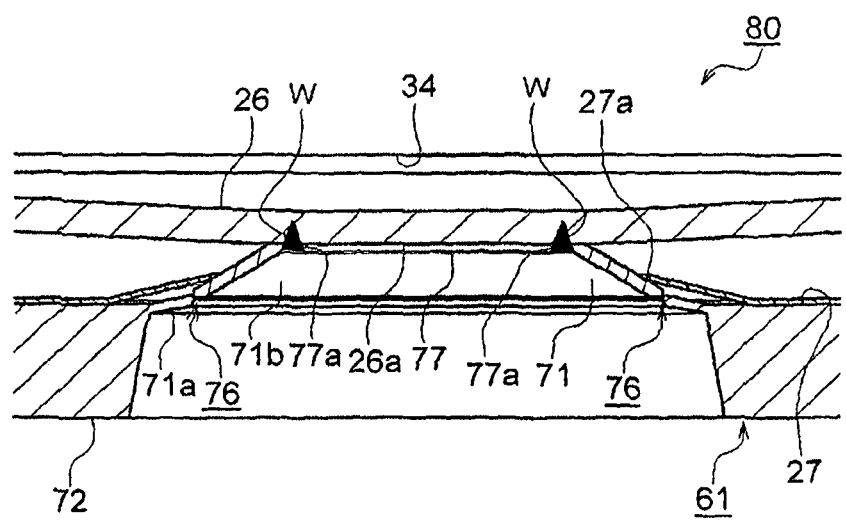
FIG. 9 is an enlarged view of the current interrupt section of the current interrupt device according to the embodiment of the present invention.
Figure 10:
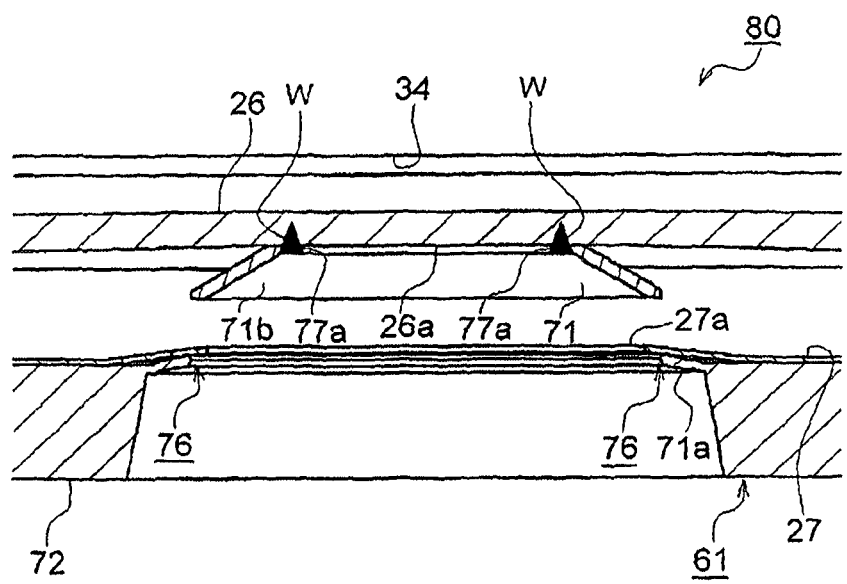
FIG. 10 is an enlarged view of the current interrupt section of the current interrupt device according to the embodiment of the present invention.

FIG. 9 and FIG. 10 show a state of the insulating film 27 when the thinned section 71 is broken. As shown in FIG. 9, such an insulating film 27 is bent when the internal pressure of the battery case 12 (see FIG. 1) is increased and the current interrupt valve 26 and the thinned section 71 are consequently raised, and the inner peripheral edge of the insulating film 27 is lifted.

Then, as shown in FIG. 10, once the thinned section 71 is broken along the notch 76, a piece 71b of the thinned section 71 that is joined to the current interrupt valve 26 passes through the holes 27a of the insulating film 27 and moves above the insulating film 27 (to the current interrupt valve 26 side). On the internal terminal section 61, the insulating film 27 extends to the inner side of the circle on which the notch 76 is formed. In this state, the insulating film 27 extends between both of the edges of the broken thinned section 71 (between the piece 71b of the broken thinned section 71 and a piece 71a of the remaining thinned section 71 in the internal terminal section 61).

Therefore, even if the current interrupt valve 26 returns to an original shape, the insulating film 27 is interposed between the piece 71b of the broken thinned section 71 and the remaining thinned section 71 in the internal terminal section 61. This prevents the piece 71b of the broken thinned section 71 from contacting the piece 71a of the remaining thinned section 71 in the internal terminal section 61. Therefore, it is possible to prevent the current interrupt valve 26 from being electrically reconnected to the internal terminal section 61.

A thin film having insulation properties can be used for such an insulating film 27, for example, and the insulating film 27 preferably has required flexibility and tension (elasticity, strength). A resinous film such as polypropylene (PP), polyethylene (PE), or polyphenylene sulfide (PPS) can be used for such an insulating film 27. In addition, in this case, a film in thickness of approximately 20 μm to 100 μm, for example, may be used for the insulating film 27.

It should be noted that, as shown in FIG. 6, an inner diameter of the circular hole 27a of the insulating film 27 is preferably smaller than the diameter of the notch 76 of the thinned section 71 in the embodiment in which the insulating film 27 is disposed on the thinned section 71. If the inner diameter of the circular hole 27a of the insulating film 27 is smaller than the diameter of the notch 76 of the thinned section 71, the insulating film 27 extends between both of the edges of the broken thinned section 71 after the thinned section 71 is broken. If the inner diameter of the circular hole 27a of the insulating film 27 is sufficiently smaller than the diameter of the notch 76 of the thinned section 71, a length of the insulating film 27 that extends between both of the edges of the broken thinned section 71 becomes long, and it is thus possible to reliably inhibit the current interrupt valve 26 from being electrically reconnected to the internal terminal section 61.

On the contrary, if the inner diameter of the circular hole 27a of the insulating film 27 is much smaller than the diameter of the notch 76 of the thinned section 71, it can be considered that the piece 71b of the broken thinned section 71 is caught by the insulating film 27 when the thinned section 71 is broken and the current interrupt valve 26 is consequently reversed. Therefore, the inner diameter of the circular hole 27a of the insulating film 27 can be determined based on the following equation with an allowable protruding margin A of the insulating film 27 (a length of protrusion from the circle on which the notch 76 is formed) as a reference. It should be noted that a value obtained from such an equation is merely a guide regarding the inner diameter of the circular hole 27a of the insulating film 27 and that the inner diameter of the circular hole 27a is not necessarily limited to this value:

$$X^2+Y^2=Z^2; A=Z-X.$$

Figure 11:
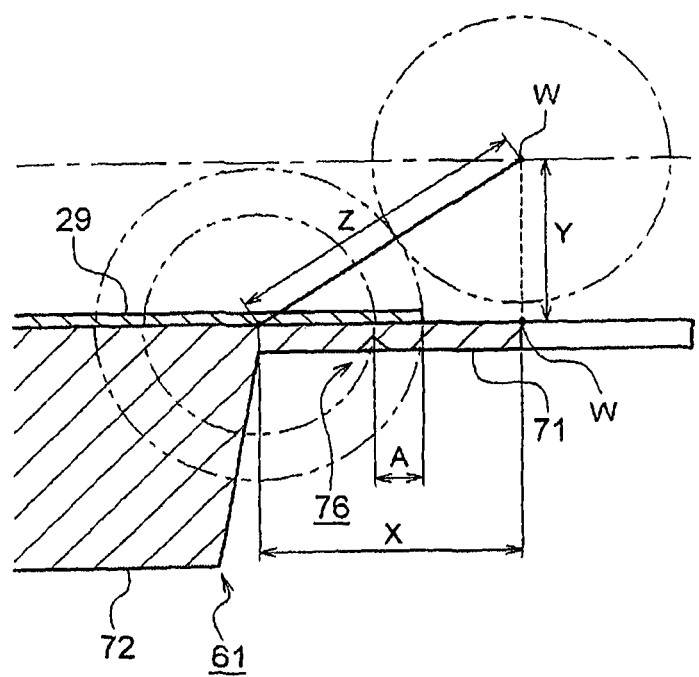
FIG. 11 is a view for showing a guide of a hole of the insulating film according to the embodiment of the present invention.

Here, the following can be said for X, Y, Z, and A (see FIG. 11): X: a distance from a joined section W of the current interrupt valve 26 and the thinned section 71 to the edge of the thinned section 71; Y: a height of reversal of the current interrupt valve 26; Z: a distance from the joined section after the reversal to the edge of the thinned section 71; and A: the allowable protruding margin of the insulating film 27 (the length of protrusion from the circle on which the notch 76 is formed).

The inner diameter of the circular hole 27a should be determined by the allowable protruding margin that is set by A as the guide. For example, the circular hole 27a may protrude from the circle on which the notch 76 is formed for a length of approximately ±20% of the allowable protruding margin that is set by A. More preferably, the circular hole 27a may protrude from the circle on which the notch 76 is formed for the length of approximately ±15% or further approximately ±10% of the allowable protruding margin that is set by A. It is preferred that the allowable protruding margin that is set by A be approximately 0.2 mm to 1.0 mm, for example.

The embodiment in which the insulating film 27 as the insulant is disposed between the current interrupt valve 26 and the internal terminal section 61 has been described. However, disposition of the insulant is not limited to the above.

Figure 12:
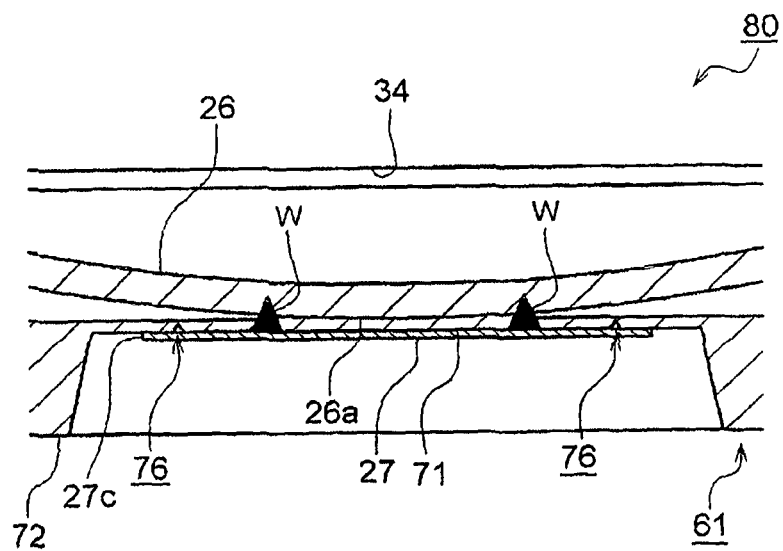
FIG. 12 is an enlarged view of the current interrupt section of the current interrupt device according to another embodiment of the present invention.
Figure 13:
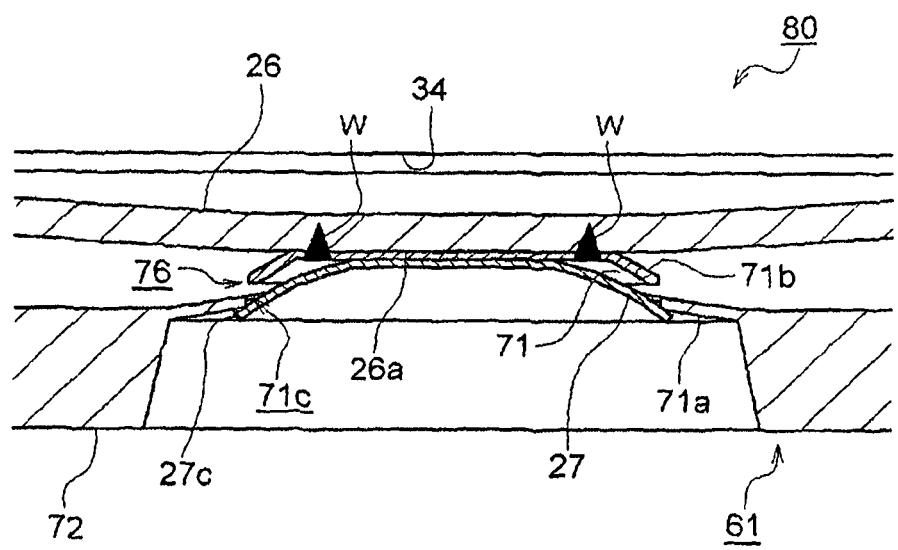
FIG. 13 is an enlarged view of the current interrupt section of the current interrupt device according to another embodiment of the present invention.
Figure 14:
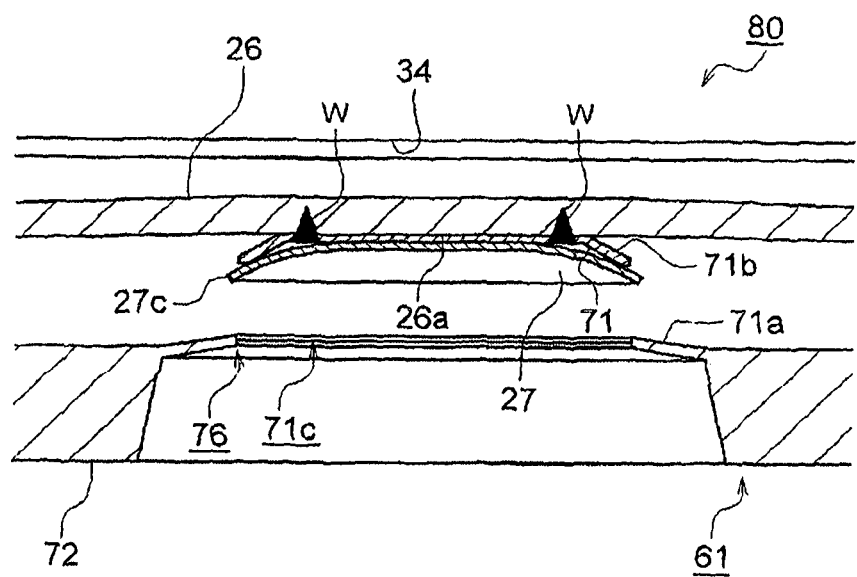
FIG. 14 is an enlarged view of the current interrupt section of the current interrupt device according to another embodiment of the present invention.

FIG. 12 to FIG. 14 show another embodiment of the current interrupt device 80. FIG. 12 shows a state in which the insulating film 27 as the insulant is disposed in the current interrupt device 80 according to another embodiment. As shown in FIG. 12, for example, the insulating film 27 as the insulant may be attached to a surface on the internal terminal section 61 side of the joined portion between the thinned section 71 and the current interrupt valve 26. In this case, the insulating film 27 is preferably attached to cover at least a part of the thinned section 71. In this embodiment, the thinned section 71 is formed with the notch 76 that determines the portion to be broken. Accordingly, the insulating film 27 as the insulant is preferably attached to the thinned section 71 on the inner side of the notch 76 and preferably extends to the outer side of the notch 76. As described above, it is preferred that the insulating film 27 be attached to the joined portion between the thinned section 71 and the current interrupt valve 26 on the inner side of the portion where the thinned section 71 is broken and that an outer edge 27c of the insulating film 27 extend to the outer side of the portion where the thinned section 71 is broken.

In the embodiment shown in FIG. 12, the insulating film 27 is a circular film, for example. The thinned section 71 does not have the hole 77 as shown in FIG. 6, and the thinned section 71 is aligned with the center 26a of the current interrupt valve 26 and joined thereto. Here, the thinned section 71 is preferably joined to the center 26a of the current interrupt valve 26 by laser welding. The insulating film 27 is attached to the surface of the thinned section 71 that is opposite from the current interrupt valve 26 at the center of the thinned section 71 (the inner side of the joined section W) that is welded to such a current interrupt valve 26. As described above, a joining structure between the thinned section 71 and the current interrupt valve 26 is not limited to that described for the embodiment shown in FIG. 6.

FIG. 13 and FIG. 14 show a state of the insulating film 27 when the thinned section 71 is broken. When the internal pressure of the battery case 12 (see FIG. 1) is increased, the current interrupt valve 26 and the thinned section 71 are raised. The current interrupt valve 26 and the thinned section 71 are bent while being raised. At this time, the insulating film 27 is also bent following the deformation of the thinned section 71. Furthermore, when the internal pressure of the battery case 12 (see FIG. 1) is increased to or above the specified level, the thinned section 71 is broken along the notch 76 as shown in FIG. 13. Once the thinned section 71 is broken, the piece 71b of the thinned section 71 that is joined to the current interrupt valve 26 is separated from the piece 71a of the remaining thinned section 71 in the internal terminal section 61.

At this time, the insulating film 27 is joined to the piece 71b of the thinned section 71 that is joined to the current interrupt valve 26. As shown in FIG. 14, the insulating film 27 passes through the hole 71c that is formed in the piece 71a of the remaining thinned section 71 in the internal terminal section 61, and moves above the internal terminal section 61 (the current interrupt valve 26 side of the internal terminal section 61). The insulating film 27 extends to the outer side of the piece 71b of the thinned section 71 that is joined to the current interrupt valve 26 after moving above the internal terminal section 61 (the current interrupt valve 26 side of the internal terminal section 61). In this state, the insulating film 27 extends between both of the edges of the broken thinned section 71 (between the piece 71b of the broken thinned section 71 and the piece 71a of the remaining thinned section 71 in the internal terminal section 61).

Accordingly, even when the current interrupt valve 26 returns to the original shape, the insulating film 27 is interposed between the piece 71b of the broken thinned section 71 and the piece 71a of the remaining thinned section 71 in the internal terminal section 61. Thus, the piece 71b of the broken thinned section 71 does not contact the piece 71a of the remaining thinned section 71 in the internal terminal section 61 again. Therefore, the current interrupt valve 26 is inhibited from being electrically reconnected to the internal terminal section 61. As described above, the insulating film 27 may be attached to the surface on the internal terminal section 61 side of the joined portion between the thinned section 71 and the current interrupt valve 26.

It should be noted that, as shown in FIG. 12, the diameter of the insulating film 27 is preferably larger than the diameter of the notch 76 of the thinned section 71 in the embodiment in which the insulating film 27 is disposed under the thinned section 71. If the diameter of the insulating film 27 is larger than the diameter of the notch 76 of the thinned section 71, the insulating film 27 extends between both of the edges of the broken thinned section 71 after the thinned section 71 is broken. If the diameter of the insulating film 27 is sufficiently larger than the diameter of the notch 76 of the thinned section 71, the length of the insulating film 27 that extends between both of the edges of the broken thinned section 71 is increased. Therefore, the current interrupt valve 26 can more reliably be inhibited from electrically reconnected to the internal terminal section 61. On the other hand, if the diameter of the insulating film 27 is much smaller than the diameter of the notch 76 of the thinned section 71, there is a possibility that the current interrupt valve 26 is electrically reconnected to the internal terminal section 61.

Accordingly, the diameter of the insulating film 27 is determined based on the following equation with the allowable projecting margin A of the insulating film 27 (the length of protrusion from the circle on which the notch 76 is formed) as the reference.

It should be noted that the value obtained by such an equation is merely a guide regarding the diameter of the insulating film 27 and that the diameter of the insulating film 27 is not necessarily limited to this value:

$$X^2 + Y^2 = Z^2; A = Z - X.$$

Figure 15:
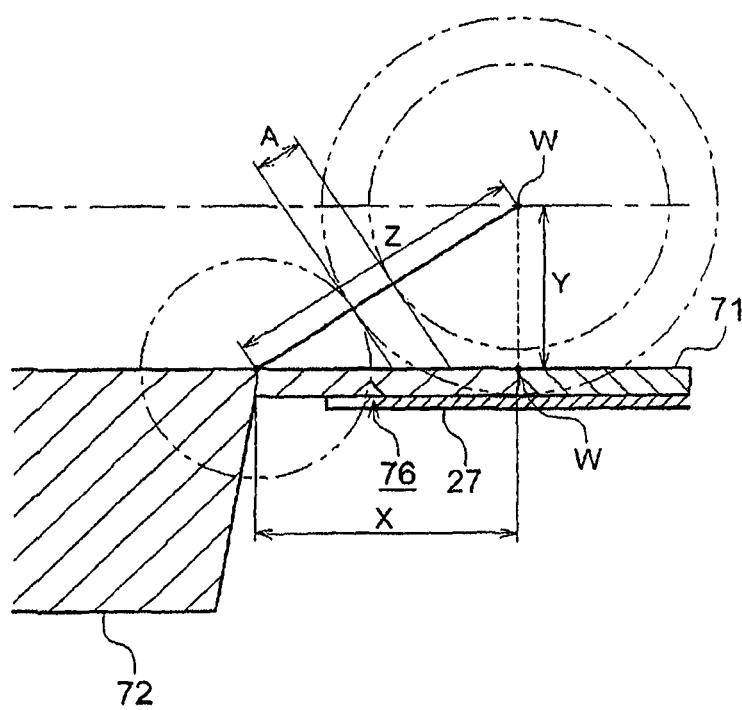
FIG. 15 is a view for showing a guide of a diameter of the insulating film in the current interrupt device according to another embodiment of the present invention.

Here, the following can be said for X, Y, Z, and A (see FIG. 15): X: the distance from the joined section of the current interrupt valve 26 and the thinned section 71 to the edge of the thinned section 71; Y: the height of reversal of the current interrupt valve 26; Z: the distance from the joined section after the reversal to the edge of the thinned section 71; and A: the allowable protruding margin of the insulating film 27 (the length of protrusion from the circle on which the notch 76 is formed).

The diameter of the insulating film 27 is preferably determined by the allowable protruding margin that is set by A as the guide. For example, the insulating film 27 may protrude from the notch 76 for the length of approximately ±20% of the allowable protruding margin that is set by A. More preferably, the insulating film 27 may protrude from the notch 76 for the length of approximately ±15% or further approximately ±10% of the allowable protruding margin that is set by A. It is preferred that the allowable protruding margin that is set by A be approximately 0.2 mm to 1.0 mm, for example.

As described above, a very high current acts for a vehicle. Therefore, when the battery current of the lithium-ion battery 10 is interrupted by the current interrupt device 80, it is preferred that a interrupt state of the battery current be reliably maintained. As described above, in the lithium-ion battery 10 according to the embodiment of the present invention, when the battery current of the lithium-ion battery 10 is interrupted by the current interrupt device 80, the insulating film 27 (insulant) extends between both of the edges of the broken thinned section 71 of the internal terminal section 61. Therefore, the interrupt state of the battery current in the lithium-ion battery 10 is further reliably maintained. Here, a film is raised as an example of the insulant that is interposed between both of the edges of the broken thinned section 71 of the internal terminal section 61. However, the insulant that is interposed between both of the edges of the broken thinned section 71 of the internal terminal section 61 does not have to be the film as long as it is interposed between both of the edges of the broken thinned section 71 of the internal terminal section 61 and inhibits the current interrupt valve 26 and the internal terminal section 61 from being electrically reconnected to each other. Therefore, the insulant does not have to be the film.

Figure 16:
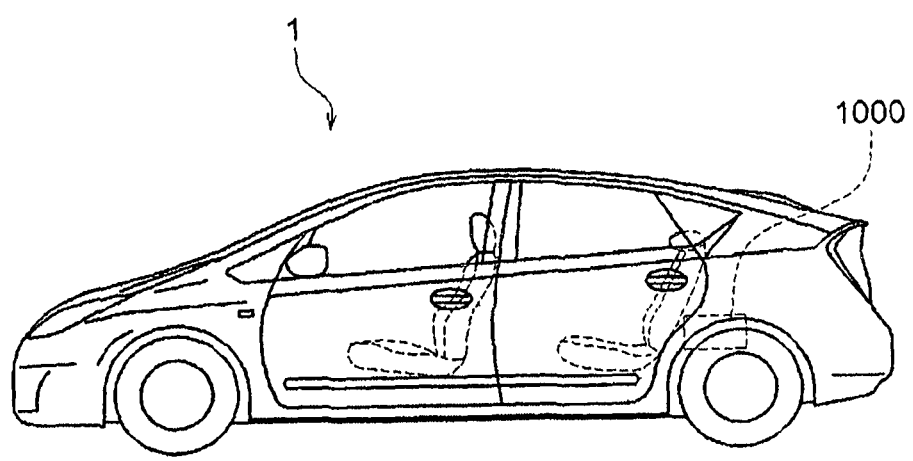
FIG. 16 is a view for showing a vehicle in which the lithium-ion battery according to the embodiment of the present invention is mounted.

The lithium-ion battery as the secondary battery according to the embodiment of the present invention has been exemplified so far. However, the secondary battery according to the embodiment of the present invention is not limited to the lithium-ion battery and can be applied to various types of sealed battery. In addition, the lithium-ion battery as the secondary battery is particularly suited for a secondary battery for a driving power source of a vehicle that requires a high capacity and high output, such as a drive battery for a hybrid vehicle, a plug-in hybrid vehicle, or an electric vehicle that requires excellent output characteristics. In this case, for example, as shown in FIG. 16, a battery pack 1000 in which the plural lithium-ion batteries 10 are combined and connected together is adopted as the embodiment, and the battery pack 1000 can preferably be used as the drive battery for a vehicle that serves as a power source of a motor (electric motor) that directly drives a drive wheel of a vehicle 1.

The invention claimed is:

1. A secondary battery comprising:
   a battery case;
   an electrode body that is housed in the battery case;
   a connecting terminal that is provided in the battery case; and
   a current interrupt device that comprises a current interrupt valve, a current collector, and an insulant, and that electrically connects the connecting terminal to the electrode body, and electrically cuts off the connecting terminal from the electrode body when a gas pressure in the battery case is increased to or above a specified level,
   wherein the current interrupt valve is formed of a conductive thin plate and is attached to an opening of the connecting terminal on an inner side of the battery case so as to cover the opening,
   the current collector comprises: a thickened section that is provided in a position to face a surface of the current interrupt valve on the inner side of the battery case; and a thinned section that is formed in a center of the thickened section and joined to the current interrupt valve,
   when the gas pressure in the battery case is increased to or above the specified level, the thinned section is broken around a portion that is joined to the current interrupt valve along with deformation of the current interrupt valve, and the connecting terminal is electrically interrupted from the electrode body, and
   the insulant is disposed in a portion where the thinned section is broken and extends beyond a broken edge of the broken thinned section that remains coupled to the current collector so as to be interposed in between broken edges of the broken thinned section after the thinned section is broken;
   wherein the insulant is a film having flexibility, the thinned section is joined to a center of the current interrupt valve, and the insulant is attached to a surface of the thinned section at a center of the thinned section, the surface of the thinned section being opposite to another surface of the thinned section attached to the current interrupt valve, the thinned section is formed with a notch that determines the portion to be broken, and the insulant is attached to the thinned section at a position inside the notch and extends beyond the notch to a position outside the notch.

* * * * *